United States Patent

Beumer

Patent Number: 5,167,168
Date of Patent: Dec. 1, 1992

[54] DRIVING GEAR FOR A MUSCLE POWER DRIVEN VEHICLE, SUCH AS A WHEEL CHAIR

[75] Inventor: Anton H. Beumer, Silvolde, Netherlands

[73] Assignee: Revab B.V., Silvoilde, Netherlands

[21] Appl. No.: 693,354

[22] Filed: Apr. 30, 1991

[30] Foreign Application Priority Data

May 2, 1990 [NL] Netherlands ............... 9001051

[51] Int. Cl.$^5$ .................... F16H 27/02; B62M 1/14
[52] U.S. Cl. ...................... 74/810.1; 74/143; 74/377; 280/250.1
[58] Field of Search ............. 280/253.1, 253, 250.1, 280/257, 264; 74/143, 369, 371, 372, 810.1, 377; 192/48.92, 48.6

[56] References Cited

U.S. PATENT DOCUMENTS

| | | | |
|---|---|---|---|
| 708,286 | 9/1902 | Wild, Jr. | 74/810.1 |
| 3,309,110 | 3/1967 | Bulmer | 74/143 X |
| 3,994,509 | 11/1976 | Schaeffer | 280/250.1 OR |
| 4,343,612 | 8/1982 | Blanchard | 74/372 X |
| 4,501,169 | 2/1985 | Stilin | 74/810.1 OR |
| 4,523,769 | 6/1985 | Glaser et al. | 74/143 X |
| 4,766,772 | 8/1988 | Tsuchie | 192/49.92 X |
| 4,802,387 | 2/1989 | Williams, III | 74/810.1 OR |
| 4,811,964 | 3/1989 | Horn | 280/250 OR |
| 4,858,483 | 8/1989 | Blakemore | 74/143 OR |
| 5,037,120 | 8/1991 | Parisi | 280/250.1 OR |

FOREIGN PATENT DOCUMENTS

| | | |
|---|---|---|
| 0004205 | 9/1979 | European Pat. Off. . |
| 136705 | 4/1987 | European Pat. Off. . |
| 3932538 | 3/1990 | Fed. Rep. of Germany . |
| 511147 | 12/1920 | France . |
| 1096982 | 6/1955 | France . |
| 2307696 | 11/1976 | France . |
| 2369960 | 6/1978 | France . |
| 125852 | 5/1919 | United Kingdom . |
| 569563 | 5/1945 | United Kingdom . |

*Primary Examiner*—Leslie A. Braun
*Assistant Examiner*—Daniel Wittels
*Attorney, Agent, or Firm*—Hoffmann & Baron

[57] ABSTRACT

A driving gear for a muscle power driven vehicle, such as a wheel chair, comprising an input shaft drivable by means of a lever, and adapted to be coupled through at least two freewheel clutches to an output shaft arranged to be connected to a wheel hub of the vehicle, wherein the driving gear (4) is housed in a closed housing (11, 12) which is arranged to be coupled through said output shaft (22) to the wheel hub (5) of the vehicle, said input shaft (7) being fixedly coupled to an input gear wheel (14) meshing with two separate intermediate gear wheels (16, 16') adapted to be connected through freewheel clutches operative in opposite directions of rotation to one (20) or the other (20') of two meshing change gear wheels, one of which also meshes with a first output gear wheel (21) mounted on the output shaft.

6 Claims, 2 Drawing Sheets

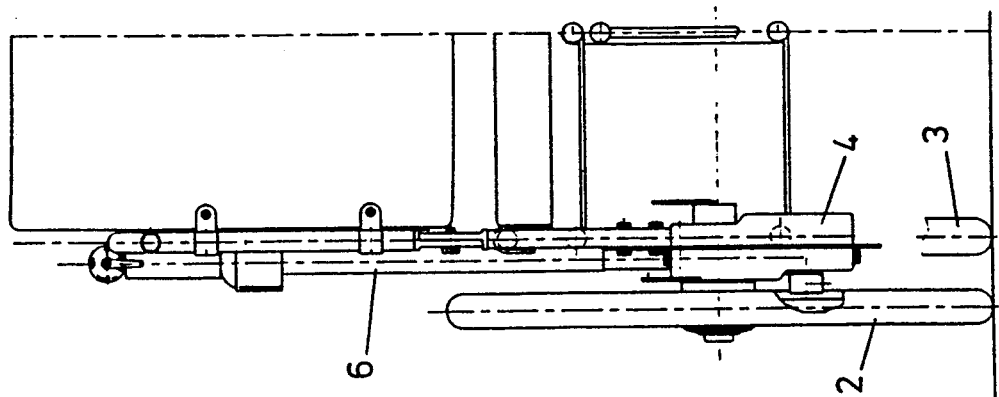
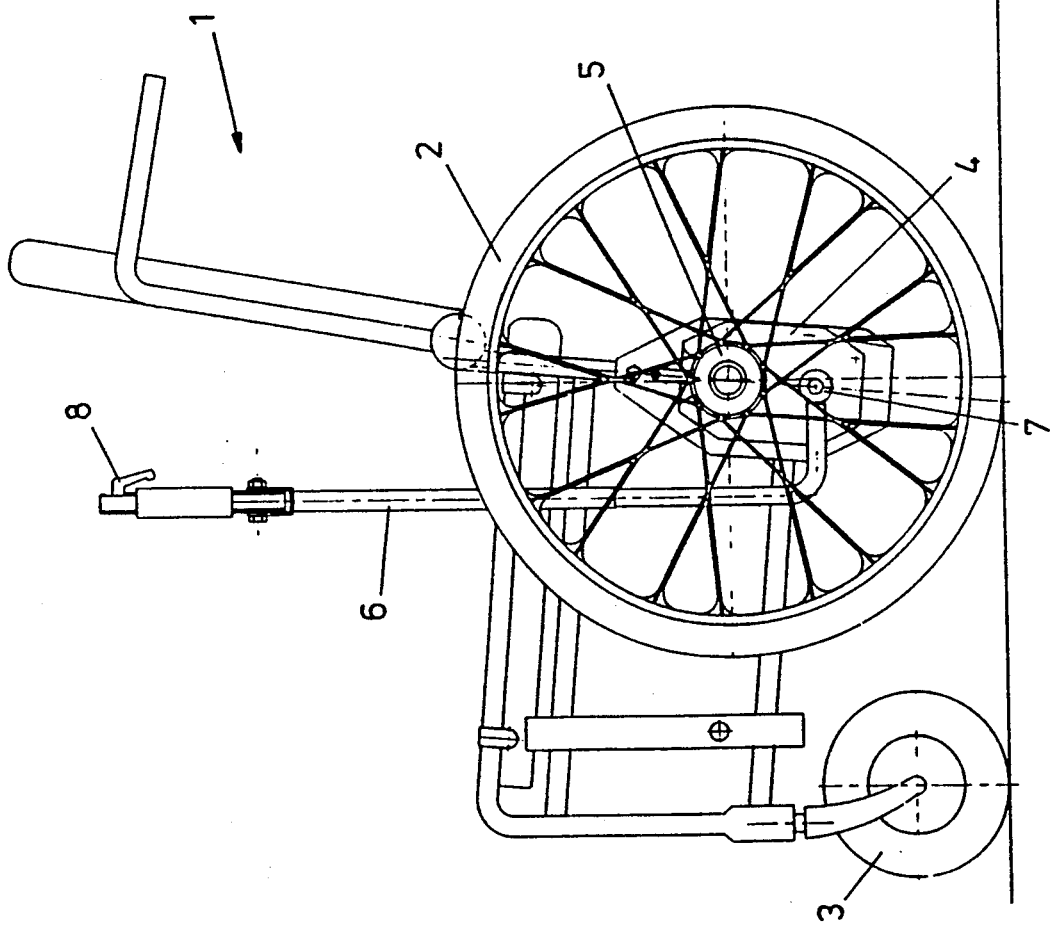

DRIVING GEAR FOR A MUSCLE POWER DRIVEN VEHICLE, SUCH AS A WHEEL CHAIR

This invention relates to a driving gear for a muscle power driven vehicle, such as a wheel chair, comprising an input shaft drivable by means of a lever, and adapted to be coupled through at least two freewheel clutches to an output shaft arranged to be connected to a wheel hub of the vehicle.

A driving gear of this kind is known from European patent application 0,136,705. This known gear is built in as to a considerable part in the hub of a wheel chair wheel, and includes two input shafts, each provided with a rope pulley. These rope pulleys can be driven by means of a lever, carrying two other rope pulleys at its lower end. One pair of rope pulleys, one pulley of which is connected to the lever and the other to the wheel hub, serves to drive the wheel hub during the push stroke of the lever, while the other pair of rope pulleys serves to drive the wheel hub during the pull stroke of the lever. Indeed, the V-rope is lapped crosswise around the second pair of rope pulleys to provide the desired reversal of movement in the drive system.

The two rope pulleys associated with the wheel hub can be connected through freewheel clutches operative in the same direction of rotation with a drive bush provided within the wheel hub, which drive bush is connected through a gear clutch with the wheel hub proper.

For driving the wheel chair in the rearward direction, a third freewheel clutch is provided, which is operative in the other direction of rotation from the two former freewheel clutches, and can be coupled to the wheel hub through one of the rope pulleys connected to the wheel hub by shifting the gear clutch into the reverse position.

A disadvantage of this known clutch is the sub-division of the drive gear, which is arranged partly within the wheel hub and partly at the lower end of the lever, with both parts of the gear being coupled together by means of rope pulleys. The presence of non-screened V-ropes in a wheel chair is objectionable on the ground of both safety and efficiency considerations. As a considerable part of the drive gear is mounted within the wheel hub, the gear is unsuitable for being mounted as a separate drive unit in wheel chairs with the normal, conventional wheel hubs.

To drive the wheel chair in the reverse direction, the pulling movement of the lever is available only, and its pushing movement is a dead stroke. For the wheel chair to be driven in the rearward direction also during the pushing stroke, an additional freewheel clutch should be included in the drive gear.

It is an object of the present invention to overcome the above-described disadvantages of this known driving gear. For this purpose, the driving gear according to the invention is characterized by being housed in a closed housing which is arranged to be coupled through said output shaft to the wheel hub of the vehicle, said input shaft being fixedly coupled to an input gear wheel meshing with two separate intermediate gear wheels adapted to be connected through freewheel clutches operative in opposite directions of rotation to one or the other of two meshing change gear wheels, one of which also meshes with a first output gear wheel mounted on the output shaft.

By virtue of the entire drive gear being housed in a closed housing, which can be coupled in a relatively simple manner with the hub of a wheel chair wheel, the driving gear can be more easily adapted to, for example, the transmission ratio desirable for a given wheel chair. By connecting the freewheel clutches present in series, one and the same output gear wheel can be driven in the same direction during both the push stroke and the pull stroke of the lever, whereby, for example, during the push stroke the drive is effected through one change gear wheel, and during the pull stroke automatically the other change gear wheel is engaged. There is thus in addition obtained one single input shaft which can be driven directly, i.e. without a rope transmission, through the lever.

To drive the wheel chair in the rearward direction, a second output gear wheel is provided on the output shaft, which gear wheel meshes with the second change gear wheel.

By providing a separate output gear wheel on the output shaft for the movement in the rearward direction, the movement in the rearward direction can take place during both the pushing and the pulling stroke of the lever. During these movements, the change gear wheels perform exactly the same function as during the movement in the forward direction.

For the drive of the wheel chair in one or in the other direction, the output gear wheels can each be coupled with the output shaft by means of a row of balls, which balls can be displaced outwards by means of an axially slidable engaging shaft mounted within the output shaft and including a shifting boss.

By shifting the engaging shaft, the row of balls associated with one output gear wheel can be engaged, and the row of balls for the other output gear wheel remains inoperative, or the other way round. The engaging shaft can also be placed in a neutral position, in which neither of the rows of balls arranged within the output gear wheels is coupled with the associated output gear wheel.

One embodiment of the driving gear according to the present invention will now be described in more detail, by way of example, with reference to the accompanying drawings. In said drawings, FIG. 1 shows a side-elevational view of a wheel chair according to the present invention;

FIG. 2 is a partial rear view of the wheel chair shown in FIG. 1;

Figure 5:
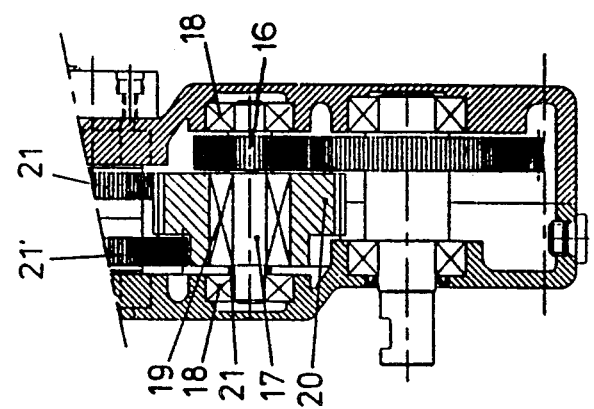
FIG. 5 shows a cross-sectional view, taken on the line V—V of FIG. 4.

The wheel chair 1 shown in FIGS. 1-2 includes two relatively large rear wheels 2 and two smaller, swivelling front wheels 3. The hub 5 of the rear wheels is connected to a drive gear 4, including an input shaft 7 which can be driven by means of an operating lever 6. Lever 6 also serves for steering the two front wheels 3 through bottom ropes not shown. Disposed at the upper end of the operating lever 6 is a change pawl 8 for shifting the engaging shaft of the driving gear into, for example, the forward, rearward or neutral position.

Figure 4:
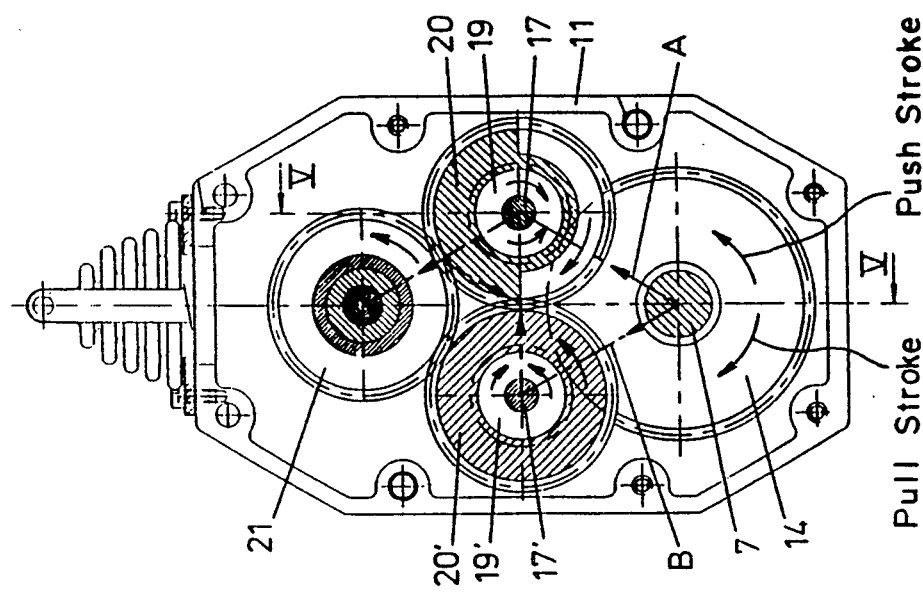
FIG. 4 is a cross-sectional view, taken on the line IV—IV of FIG. 3.
Figure 3:
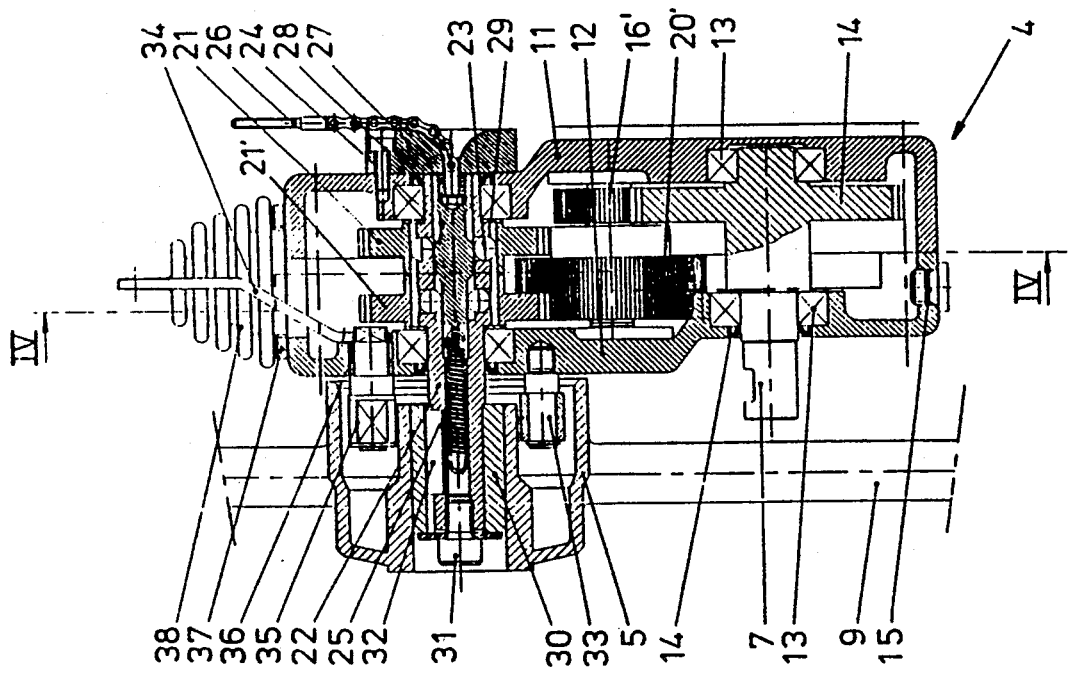
FIG. 3 shows a cross-sectional view of the driving gear, coupled with the wheel hub of a wheel chair wheel.

The driving gear 4 is illustrated in FIGS. 3–5. Gear 4 is housed in a housing consisting of two dish-shaped housing sections 11, 12, which are bolted together.

Housing section 12 is connected in a manner to be described hereinafter with the wheel hub 5 of a rear wheel 2.

The input shaft 7 of the driving gear is at the bottom of housing 11, 12 and is journalled in bearings 13. Mounted on input shaft 7 is an input gear wheel 14. The entire driving gear can run in an oil bath, which can be drained by means of a plug 15 provided at the bottom of the housing. The lower end of operating lever 6 is coupled in a suitable manner to the part of the input shaft 7 projecting from housing 11, 12, for example, by means of a crank key.

The input gear wheel 14 meshes with two intermediate gear wheels 16, 16' respectively mounted on sub-shafts 17, 17'. These sub-shafts are journalled in the two housing halves by means of bearings 18. Mounted on the intermediate shaft 17, through a one-way freewheel clutch 19, is a change gear wheel 20 which meshes with gear wheel 21 mounted on output shaft 22.

Similarly, a change gear wheel 20' is mounted on intermediate shaft 17' (see FIG. 4) through a freewheel clutch 19', whose direction of engagement is opposite to the direction of engagement of clutch 19. Change gear wheel 20' meshes with both change gear wheel 20 and a gear wheel 21' mounted on output shaft 22. Gear wheel 21 on output shaft 22 serves to drive the wheel chair in the forward direction, whereas gear wheel 21' on output shaft 22 serves to drive the wheel chair in the rearward direction.

Output shaft 22 is journalled in housing 11, 12 by means of bearings 29. Output shaft 22 is hollow, and within it an engaging shaft 24 is slidably mounted. Shaft 24 includes a shifting boss which is capable of forcing one of the two rows of balls 23 provided in output shaft 22 in the outward direction, thereby to effect a coupling with one of the output gear wheels 21, 21'. Engaging shaft 24 is provided at the left-hand end with a tension spring 25, while a shifting chain 26 is connected to the other end of shaft 24. Mounted on the right-hand housing half 11, is a chain guide 27, by means of a bolt 28, in order that chain 25 may be kept in the correct position. The position of the shifting boss on shaft 24 is controlled by pawl 8 on operating lever 6, which pawl can pull the chain 26 outwardly to a greater or lesser extent against the action of spring 25. In the position shown in FIG. 3, the output gear wheel 21 is engaged as the boss on the shaft 24 has pushed the row of balls 24 outwardly against the central hole in gear wheel 21.

Driving gear 4 is connected to wheel hub 5 through the wheel axle 22, the end of which is received in a hub bushing 30, which by means of a key 32 is rotationally connected to the output shaft 22. Bushing 30 is axially pressed against a raised edge of wheel axle 22 by means of a bolt 31. Bushing 30 is connected to wheel hub 5 so as to be restrained from axial and circumferential movements. Within the wheel hub, a brake shoe is provided on a brake shaft 33 screwed into the wall of housing section 12. The other end of the brake shoe is connected to an actuating cam 35 journalled for rotation in a bushing 36 mounted in the wall of housing section 12. Cam 35 is rotatable by means of a brake rod 34, which projects from the top of housing 11, 12. The opening in the top wall of the housing is covered by means of a ring 37 and a bellows 38 connected with it.

The driving gear operates as follows:

With the engaging shaft 24 in the position as shown in FIG. 3, in which the output gear wheel 21 is coupled with output shaft 22, a forwardly directed pushing stroke of actuating lever 6 will drive the input shaft 7 counter-clockwise in FIG. 4. Accordingly, the intermediate gear wheel 16 mounted on the intermediate shaft 17 turns clockwise, when freewheel clutch 19 is operative and consequently drives gear wheel 20 clockwise. Gear wheel 20 is coupled with the output gear wheel 21, which accordingly is driven counter-clockwise, and hence wheel hub 5 is also driven counter-clockwise, i.e. in the forward direction. In FIG. 4, the force line during the push stroke of actuating lever 6 is designated by A.

During this push stroke, the intermediate gear wheel 16' on intermediate shaft 17' is also driven by the input gear wheel 14, but freewheel clutch 19' operates in the opposite direction to that of clutch 19, so that change gear wheel 20', which meshes with gear wheel 20 is idling.

During the pull stroke of actuating lever 6, the input shaft 7 and hence input gear wheel 14 are driven clockwise. Accordingly, the intermediate gear wheel 16 is driven counter-clockwise, so that the freewheel clutch 19 does not take along the change gear wheel 20. The intermediate gear wheel 16' also turns counter-clockwise, and through the now operative freewheel clutch 19' will take along change gear wheel 20', causing it to rotate counter-clockwise. The change gear wheel 20' meshes with the change gear wheel 20, and will cause the latter to rotate clockwise, whereby change gear wheel 20 will again drive output gear wheel 21 counter-clockwise, so that the rear chair wheel move in the forward direction also during the pull stroke. The force pattern resulting from the drive during the pull stroke of actuating lever 6 is indicated in FIG. 4 by the force line B.

When engaging shaft 24 is displaced so that the shifting boss carried by it forces the row of balls 23 of gear wheel 21' outwardly, a connection is effected between the output gear wheel 21' and output shaft 22. The wheel chair is driven in exactly the same way as described above for the forward direction. During the push stroke of actuating lever 6, gear wheel 21' will be driven through the two change gear wheels 20, 20', and during the pull stroke of actuating lever 6 gear wheel 21' will be driven direct through change gear wheel 20'.

I claim:

1. In a driving gear for a muscle power driven vehicle comprising an input shaft drivable by means of a lever, and adapted to be coupled through at least two freewheel clutches to an output shaft arranged to be connected to a wheel hub of the vehicle, the improvement which comprises that the driving gear is housed in a closed housing which is arranged to be coupled through said output shaft to the wheel hub of the vehicle, said input shaft being fixedly coupled to an input gear wheel meshing with two separate intermediate equally sized gear wheels adapted to be connected through freewheel clutches operative in opposite directions of rotation to one or the other of two meshing equally sized change gear wheels, one of which also meshes with a first output gear wheel mounted on the output shaft.

2. A driving gear according to claim 1, wherein a second output gear wheel is present on said output shaft, which gear wheel is in mesh with the second change gear wheel.

3. A driving gear according to claim 1, wherein the output gear wheels can each be coupled with the output shaft by means of a row of balls, which balls can be displaced outwards by means of an axially slidable engaging shaft mounted within the output shaft and including a shifting boss.

4. A driving gear according to claim 3, wherein the engaging shaft is connected at one end to a tension spring and at the opposite end to a shifting chain operable by means of a pawl provided on said drive lever.

5. A driving gear as claimed in claim 1, wherein the output shaft is arranged to be coupled with the wheel hub by means of a keyed connection.

6. A driving gear as claimed in claim 1, wherein a brake shoe is provided on the wall of the drive gear housing which faces the hub, which brake shoe can be pressed against a wall of the hub by means of an operating rod projecting from the housing.

* * * * *